US012767496B2

(12) United States Patent
Mathé

(10) Patent No.: US 12,767,496 B2
(45) Date of Patent: Oct. 20, 2026

(54) CRANE COLUMN ASSEMBLY, A CRANE, AND A VEHICLE

(71) Applicant: Palfinger AG, Bergheim bei Salzburg (AT)

(72) Inventor: Ewald Mathé, Elixhausen (AT)

(73) Assignee: Palfinger AG, Bergheim bei Salzburg (AT)

(*) Notice: Subject to any disclaimer, the term of this patent is extended or adjusted under 35 U.S.C. 154(b) by 158 days.

(21) Appl. No.: 18/592,915

(22) Filed: Mar. 1, 2024

(65) Prior Publication Data

US 2025/0276881 A1 Sep. 4, 2025

(51) Int. Cl.
*B66C 23/62* (2006.01)

(52) U.S. Cl.
CPC ...... *B66C 23/62* (2013.01); *B66C 2700/0371* (2013.01)

(58) Field of Classification Search
CPC ......... B66C 23/62; B66C 23/84; B66C 23/42; B66C 23/36; B66C 2700/0371
See application file for complete search history.

(56) References Cited

U.S. PATENT DOCUMENTS 3,669,281 A * 6/1972 Woodside ............... B66C 13/18 212/238

FOREIGN PATENT DOCUMENTS

CN 103058080 A * 4/2013
CN 114436139 A * 5/2022 ............. B66C 23/16

OTHER PUBLICATIONS

CN 103058080A Machine Translation (Year: 2013).*
CN 114436139A Machine Translation (Year: 2022).*

* cited by examiner

*Primary Examiner* — Robert W Hodge
*Assistant Examiner* — Juan J Campos, Jr.
(74) *Attorney, Agent, or Firm* — SPL Patent Attorneys PartG mbB; Kieran O'Leary

(57) ABSTRACT

It is provided a crane column assembly for a crane to be mounted on a mobile platform. The crane column assembly comprises a support arrangement arranged to support a crane boom, wherein the support arrangement is connected to a base structure. The crane column assembly further comprises a cover arrangement arranged between the support arrangement, wherein the cover arrangement covers a region of the crane column assembly which comprises a region between the support arrangement.

18 Claims, 11 Drawing Sheets

CRANE COLUMN ASSEMBLY, A CRANE, AND A VEHICLE

FIELD

Examples relate to a crane column assembly, a crane, and a vehicle cranes as set out in the appended set of claims.

BACKGROUND

In the field of crane operations, the equipment is routinely exposed to a variety of environmental elements, including dirt, dust, and water, which can significantly impact performance, necessitate frequent maintenance, and reduce overall lifespan. These considerations are widespread across the spectrum of crane operations, from stationary to mobile cranes, including those mounted on trucks, facing particularly acute conditions due to their operation across diverse and often demanding environments. Among the specific aspects encountered, water ingress in the area of the crane column represents an important subject. This phenomenon may jeopardize the structural integrity and functional reliability of the crane. Addressing these specific matters may be important to ensure resilience of cranes, their operational efficacy, and extending their service life in the face of environmental impacts.

SUMMARY

An example relates to a crane column assembly for a crane to be mounted on a mobile platform. The crane column assembly comprises a support arrangement, which is arranged to support a crane boom, wherein the support arrangement is connected to a base structure. Further, the crane column assembly comprises a cover arrangement arranged between the support arrangement, wherein the cover arrangement covers a region of the crane column assembly comprising a region between the support arrangement.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
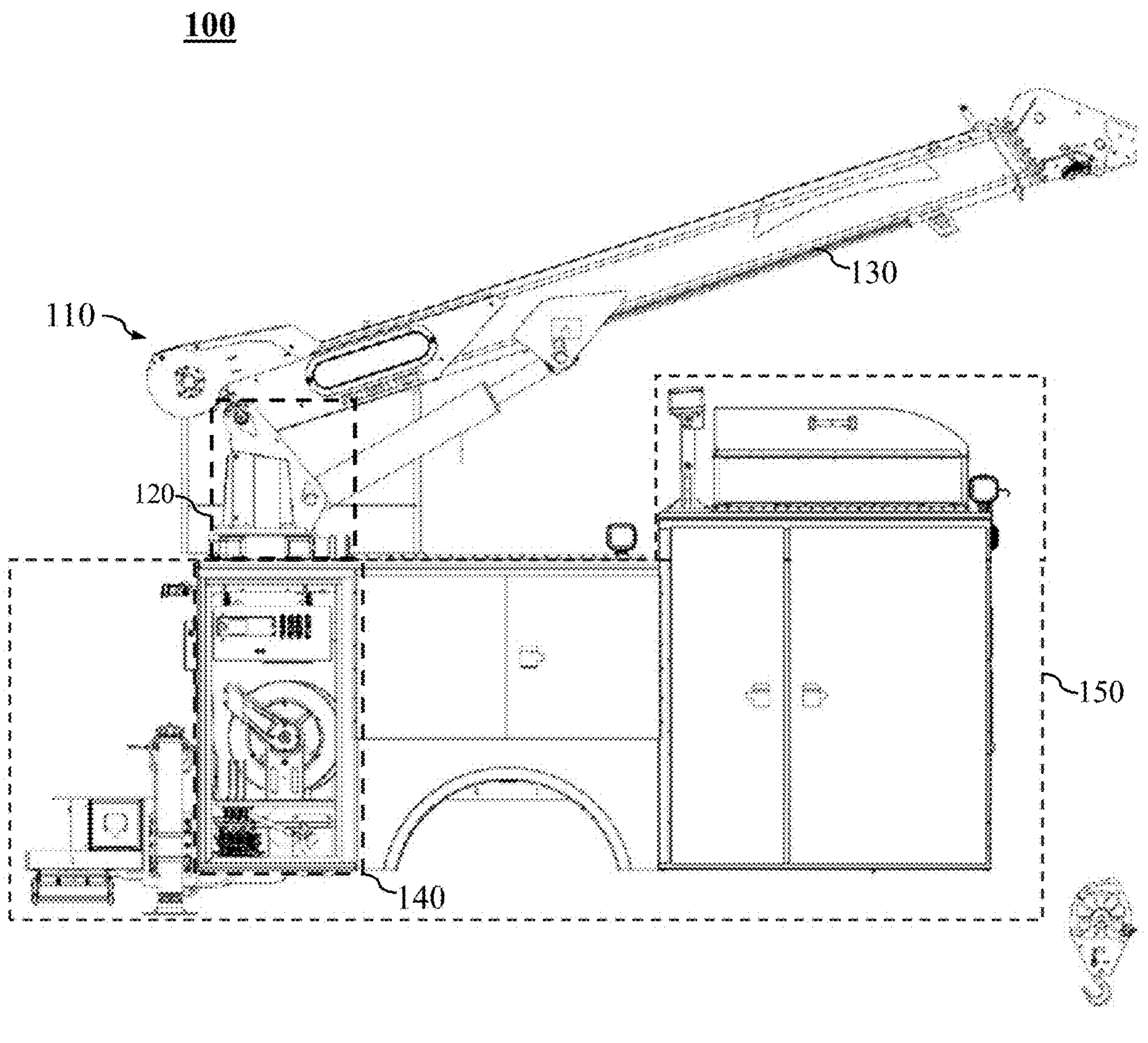
FIG. 1 illustrates an example of a crane assembly.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

FIG. 1 illustrates an example of a crane assembly 100. FIG. 1 is an overview figure illustrating an example of how a crane column assembly 120 as described in this disclosure may be employed.

The crane assembly 100 comprises a crane 110. The crane 110 may comprise the crane column assembly 120 as described in this disclosure (see FIGS. 2 to 10). Further, the crane 110 may comprise a crane boom 130 that is supported by the crane column assembly 120. For instance, the crane column assembly 120 and the boom 130 form a hinge. Further, the crane assembly 100 may comprise a crane compartment box 140. For instance, the crane column assembly 120 is mounted onto the compartment box 140. The compartment box 140 may comprise a controller configured to control the crane. Further, in some embodiments the compartment box 140 may comprise a winch controlling a crane hook. Further, the crane assembly 100 may comprise a body 150. The compartment box may be part of the body 150. The body 150 may be configured to mount the crane assembly onto a platform (see FIG. 11). In another embodiment the compartment box 140 or the crane column assembly 120 may be mounted onto a platform directly (without a body and/or compartment box).

The proposed technology of a crane column assembly 120 will be explained in the following. FIGS. 2*a* to 10 illustrate different views and parts of the crane column assembly 120. Those figures are subsequently used to discuss several aspects of the examples described in this document. However, as will become evident from the following description, the various embodiments are not limited to the illustrations described herein. The proposed technology of a crane column assembly may, in general, be used for any type of crane and any structure of the crane.

Figure 2A:
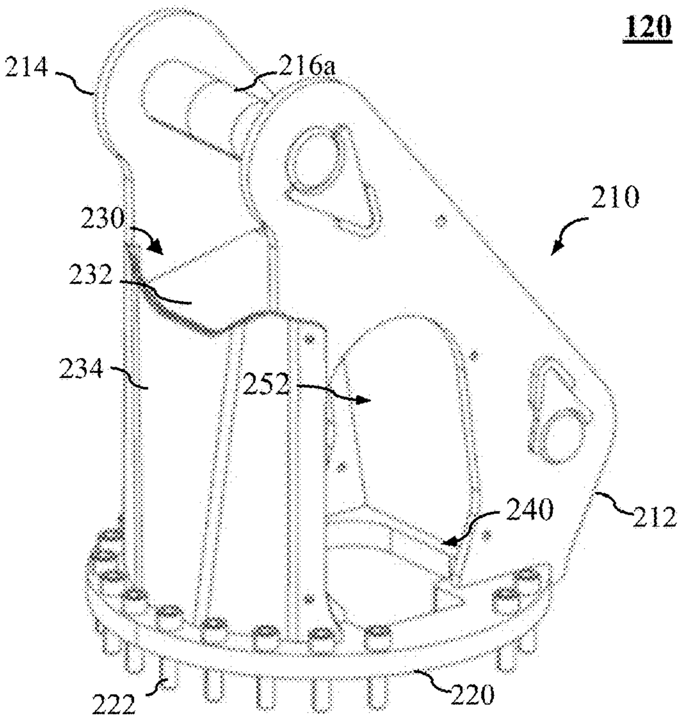
FIG. 2A illustrates an example of a crane column assembly.
Figure 2B:
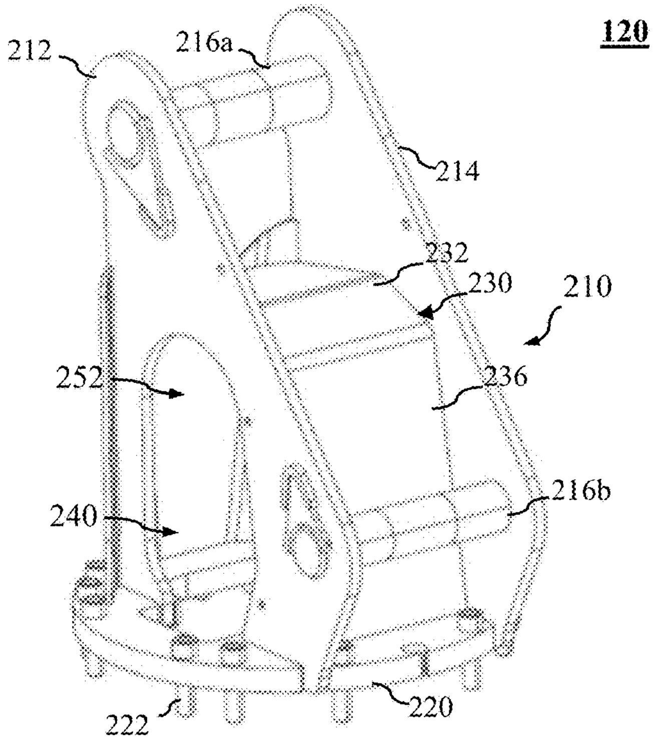
FIG. 2B illustrates an example of a crane column assembly.

FIG. 2*a* illustrates an example of a crane column assembly 120. FIG. 2*b* illustrates the example of the crane column assembly 120 of FIG. 2*a* from a different angle, i.e. rotated by 90° about a vertical axis. The crane column assembly 120 for the crane 110 may be mounted on a mobile platform. The crane column assembly 120 comprises a support arrangement 210. The support arrangement 210 is arranged to support a crane boom, for instance the crane boom 130. The support arrangement 210 is connected to a base structure 220.

The support arrangement 210 may have a height dimension, a width dimension, and a length dimension. The plane spanned by the length-width dimension may be referred to as a horizontal plane and the height dimension may be referred to as a vertical direction. For instance, a horizontal plane surface of the support arrangement 210 may be mounted on the base structure 220, i.e., that the support arrangement 210 extends vertically. In some examples the support arrangement 210 may have the shape of a cylinder or cube or the like.

The support arrangement 210 may be an object with an empty space or cavity inside, at least partly surrounded by material that forms or outlines outer limits support arrangement 210. For example, the support arrangement 210 may form a frame, i.e., it outlines space which may not be fully enclose by the outer frame limits. For instance, the support arrangement 210 may comprise a plurality of portions. The one or more portions of the support arrangement 210 may form the outer limits of the support arrangement 210. In some examples, the support arrangement may comprise a first portion 212 and a second portion 214. For instance, the first 212 and the second portion 214 are plates extending in the vertical direction and that are mounted in the horizontal plane on the base structure 220.

In some examples, the crane arm 130 may be movably connected to support arrangement 210, for example by a ball bearing or a bolt 216*a*/216*b*. For instance, the first portion 212 and the second portion 214 of the support arrangement 210 form a hinge with the crane boom 130. For example, an attachment of the hinge (for example the bolt 216*a*/216*b*) may extend between the first portion 212 and the second portion 214 of the support arrangement 210. For instance, an attachment of the hinge (for example the bolt 216*a*/216*b*), may extend in the horizontal plane between the vertically extending first portion 212 and second portion 214 of the support arrangement 210. In some examples, the support arrangement 210 may be rigidly connected to the crane arm 130, for example by bolting or welding. The crane boom may be part of a crane boom system, wherein the crane boom system may comprise a stiff boom system or a bendable boom system (e.g. a knuckle-boom system, which comprising at least one further hinge joint between the hinge at the support arrangement 210 and the crane tip).

In some examples the support structure may support one or more crane arms and/or one or more hydraulic cylinders for moving the one or more crane arms or a segment thereof. For instance, the crane arm 130 and/or the one or more hydraulic cylinders may be movably connected to support arrangement 210, for example by respective a ball bearing or bolt 216*a*/216*b*.

In some examples, a length and width dimension (which may be equal or different) of the base structure 220 may be significantly larger than a height dimension of the base structure 220 (e.g. 2, 5, 10 or 20 times as large). The base structure 220 may have a round or square or a polygonal or irregular cross-section. In some examples, the base structure has a shape of a plate or a disc. The base structure 220 may have one or more recesses or holes along the height dimension. For example, the base structure 220 may have a concentric, hollow cylindrical recess along the height dimension. The support arrangement 210 may be mounted perpendicular to a length-width dimension of the base structure 220 on a length-width surface. The support arrangement 210 may be centered or non-centered on the length-width surface of the base structure 220.

Further, the crane column assembly 120 comprises a cover arrangement 230. The cover arrangement 230 is arranged between the support arrangement 210. In other words, the cover arrangement 230 is at least partly positioned within the empty space outline by the support arrangement 210. That is the cover arrangement 230 is at least partly positioned between the outer frame limits of the support arrangement 210. For instance, the cover arrangement 230 may be at least partly formed between the plurality of portions forming the outer limits of the support arrangement 210. In some examples, where the support structure 210 may be formed by a first vertically extending plate 212 and parallel second vertically extending plate 214, the cover arrangement 230 may be arranged at least partly between these two parallel plates.

Further, the cover arrangement 230 covers a region 240 of the crane column assembly comprising a region between the support arrangement 210. In some examples, the crane column assembly may be a cylindrical, concentric, and/or ring-formed assembly. The region 240 of the crane column assembly 120 may be a region of the empty space that is formed inside crane column assembly 120 or outlined by the crane column assembly 120. That is the region 240 of the crane column assembly 120 may comprise an inner region of the crane column assembly 120. The region between the support arrangement 210 is a part of the empty space, which is formed inside the support arrangement 230 or outlined by the support arrangement 230. The region 240 of the crane column assembly as well as the region between the support arrangement 210 may be at least partly formed and bounded by the outer limits of the support arrangement 210 and the cover arrangement 230. The cover arrangement 230 may span over and provide coverage for the inner region of the crane column assembly.

That is the cover arrangement 230 may be arranged to seal the region 240 of the crane column assembly and/or the region between the support arrangement 210. Therefore, no, or less fluid or other substances may enter or region the region 240 of the crane column assembly and/or the region between the support arrangement 210. For example, rainwater that could damage the components inside the crane column assembly 120 is kept out by the cover arrangement 230 (which is also referred to as housing). Therefore, rust, or other wear caused by the ingress of fluid inside the crane column assembly 120 is minimized or prevented. Furthermore, components that may be mounted inside the region 240 (e.g. the rotary transfer system, see below) may be protected from rust or other wear caused by the ingress of fluid. Furthermore, components (e.g., for improved operation of the crane such as an endless slewing drive, see below) which are very sensitive to fluid or the like may be accommodated in a now sealed region 240, which otherwise could not have been accommodated in a non-sealed region due to rapid wear or damage by fluid.

Furthermore, the cover arrangement 230 may ensure that a body 150 and/or a platform on which the crane column assembly 120 is mounted is not damaged by moisture seeping from the region 240 of the crane column assembly 120 to the body 150. That is due to the sealing of the region 240 by the cover arrangement 230 no, or at least less, fluid will be in the region 240 and therefore no or less moisture may seep from the region 240 to the body 150 and/or a platform. In some examples, the crane column assembly 120 may be mounted onto the crane compartment box 140 (e.g., in a turn-key-solution of a stiff-boom-crane this may be a toolbox under the crane compartment where the tools and/or control electronic is integrated). The compartment box 140 that may contain, among other things, control units and/or other electronics for operating and controlling the crane (see FIGS. 1 and 11). Due the cover arrangement 230 as described above there is less moisture in the compartment box 140 and therefore no or less rust or other wear and tear caused by the ingress of fluid. Furthermore, damage to the electronics or other sensitive components in the compartment box 230 may be prevented or minimized, thereby extending the lift time of the corresponding components.

For instance, the cover arrangement 230 may be screwed, riveted, glued, welded, or connected with another type of fastening to the support arrangement 210. In another example, the cover arrangement 230 may be connected to the support arrangement 210 in such a way that they can be easily removed and reconnected, for example with a re-closable fastener. In any case the cover arrangement is sealingly connected to the support arrangement 210. Thus, the cover arrangement 230 may be arranged to seal the region 240 of the crane column assembly and/or the region between the support arrangement 210. Therefore, no fluid or other substances may enter or region the region 240 of the crane column assembly and/or the region between the support arrangement 210.

For instance, the region 240 of the crane column assembly 120 may further comprise (beside the region between the support arrangement 230) a region formed by one or more recesses or holes (along the vertical dimension) of the base structure 220 or a region below (in the vertical dimension) the base structure 220. For example, the inner region of the column assembly 120 may comprise 50%, 60%, 70% or 80% or more or less of the empty space that is formed inside or outlined by the column assembly 120.

In some examples, the region 240 of the crane column assembly 120 and/or the region between the support arrangement 210 comprises space for receiving one or more components arranged to control or operate the crane (for example rotary transfer system, see below). The cover arrangement 230 may cover at least a part of the one or more components.

In some examples, the cover arrangement 230 comprises a canopy portion 232 arranged over the region 240 of the crane column assembly and between the support arrangement 210. The canopy portion 232 of the cover arrangement 230 may be at least partly arranged in the horizontal plane between the support arrangement 230. For example, the canopy section 232 may be mounted horizontally at 50%, 60%, 70% or 80% or the like of the height of the support arrangement 210. In some examples, the cover arrangement 230 is sealed to the support structure to form a sealed canopy covering at least part of the base structure 220.

In yet another example, the cover arrangement 230 comprises at least one of a first lateral portion 234, a canopy portion 232 and a second lateral portion 236. The first lateral portion 234 and the second lateral portion 236 are arranged at least partially between the support arrangement 230. For instance, the cover arrangement 230 may have a cross-section of an upside-down U-shape or V-shape or a polygon, which is for instance approximating a semicircle or a semi-ellipse or the like.

Figure 3:
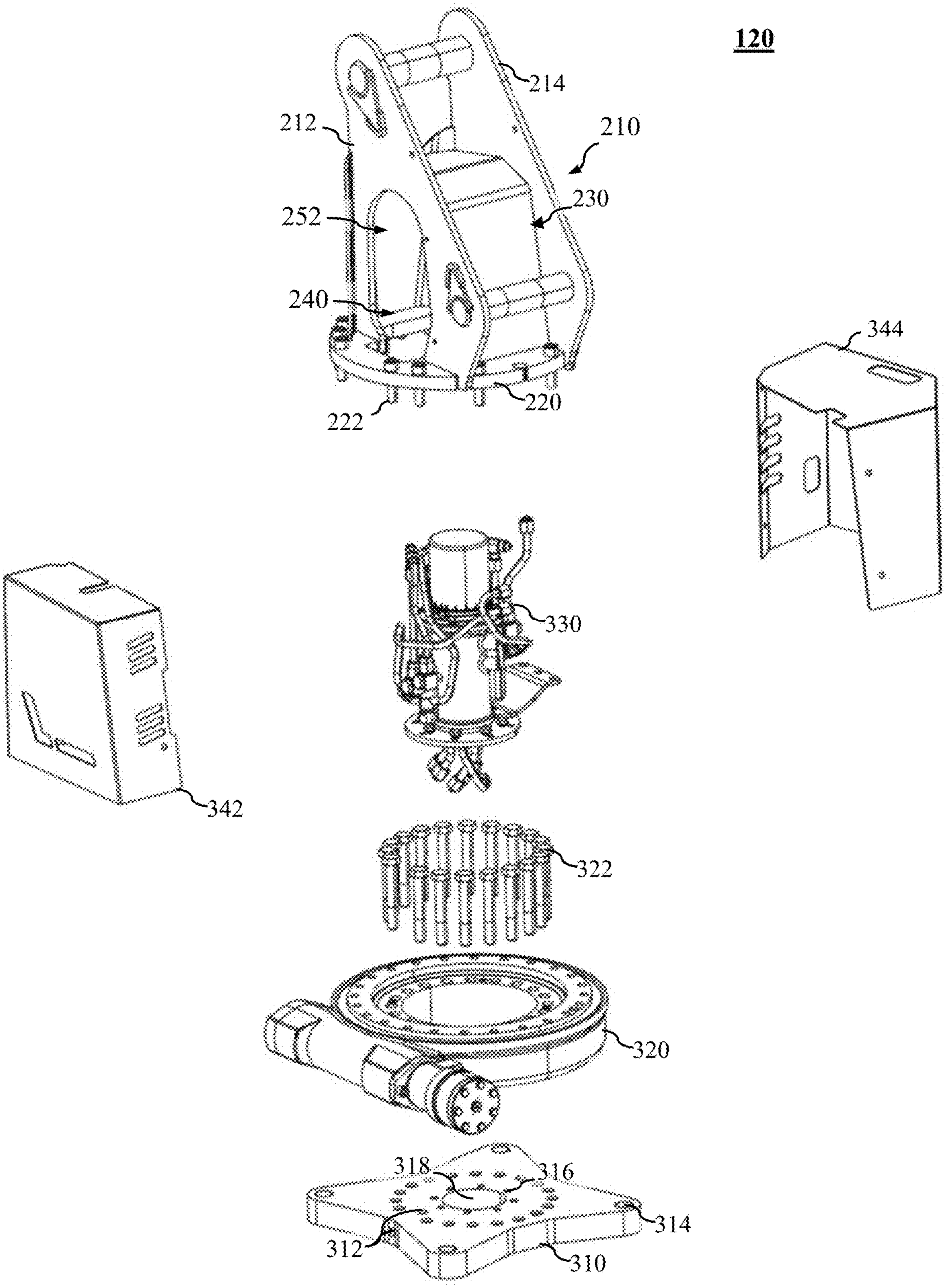
FIG. 3 illustrates an example of a crane column assembly in an exploded view diagram.
Figure 4:
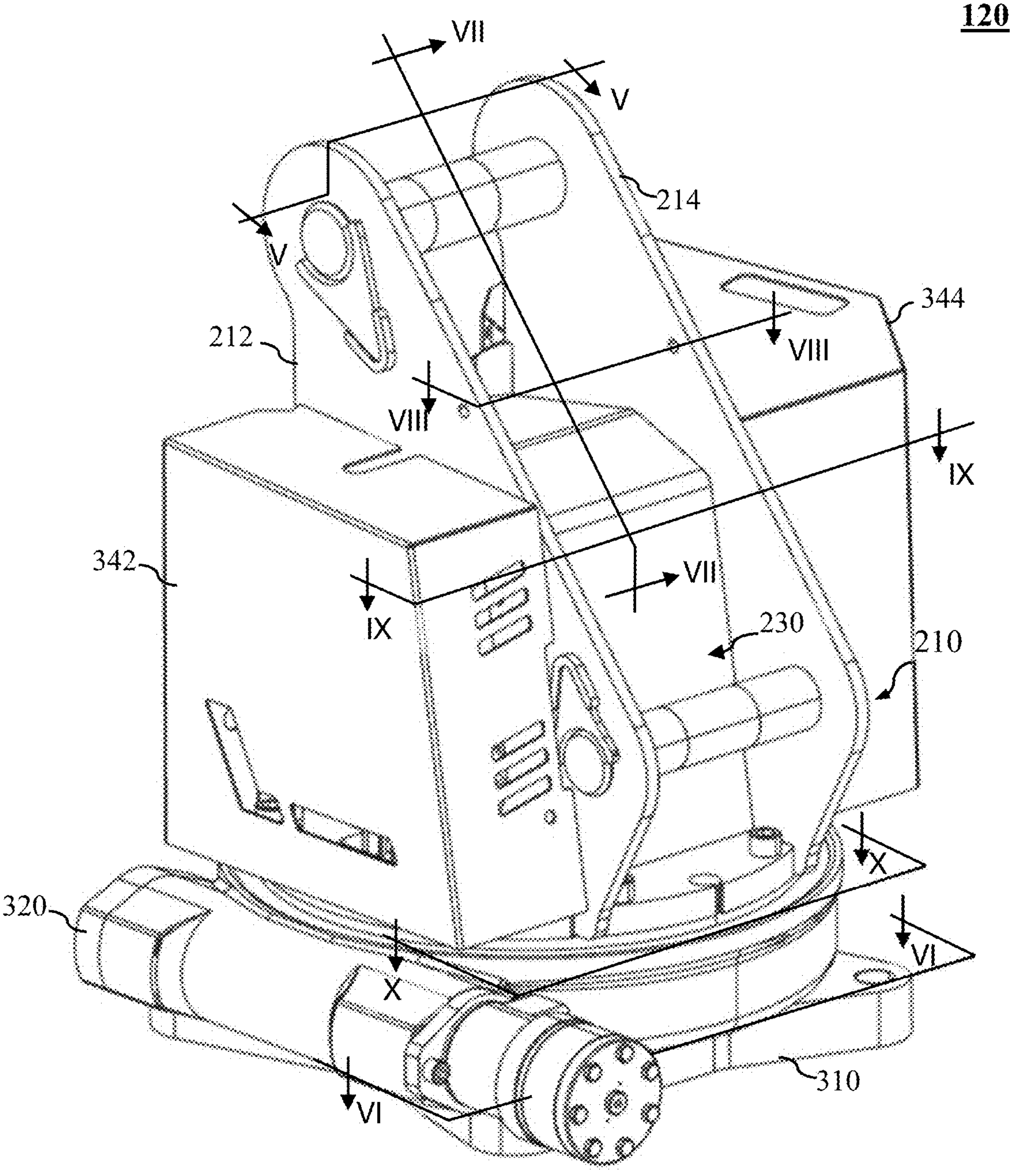
FIG. 4 illustrates an example of the crane column assembly of FIG. 3 in an assembled state.

FIG. 3 illustrates an example of the crane column assembly 120 in an exploded view diagram. FIG. 4 illustrates an example of the crane column assembly 120 of FIG. 3 in an assembled state. FIGS. 5 to 10 show different sections of the crane column assembly 120 illustrated in FIG. 4. The following descriptions apply to all these figures.

The crane column assembly 120 further comprises a base plate 310 mounted below the base structure 220. For instance, the base structure 220 may be mounted directly onto an upper surface of the base plate 310 or some other components may be mounted between the base structure 220 and the base plate 310 (see below).

Base plate 310 (see also FIG. 6) may have a round or square or a butterfly-shaped or polygonal or irregular cross-section. The base plate 310 may comprise one or more through holes 314 with which the base plate 310 may be mounted on a body 150 or a platform. These through holes 314 may be symmetrically distributed, for example at the four corners of the base plate 310. Furthermore, the base plate 310 may comprise one or more holes or bores with which other components of the crane column assembly 120 may be connected to the base plate 310. In one example, the base plate 310 comprises holes 316 with which a rotary transfer system (see below) can be mounted to it. These holes 316 may be arranged symmetrically, for example along a circle. Furthermore, the base plate 310 may comprise one or more through holes through which a connection between a component of the crane column assembly 120 or the crane and underlying components is made. For example, signal lines, power lines, oil lines, a cable for the crane hook or the like may run through the one or more connecting holes. For example, a connecting hole 318 may be located in the center of the base plate 310.

Further, the base plate 310 comprises at least one drainage channel 312 arranged to drain fluid from the region 240 covered by the cover arrangement 230. That is the drainage channel 312 is arranged to drain fluid from the inner region of the crane column assembly 120 (which is a part of the empty space that is formed inside or outlined by the column assembly 120). The drainage channel is arranged to drain fluid outwardly from the inner region of the crane column assembly 120. The drainage channel 312 may comprise a starting point inside the (inner) region 240 of the crane column assembly, an outflow point outside the region 240 of the crane column assembly 120 and a connecting piece between the starting point and the outflow point. The drainage channel 312 may drain the fluid radially or laterally away from the starting point to the outflow point on the outside, outside of the region 240 of the crane column assembly 120. Further, the starting point of the drainage channel 312 may be a point where the fluid of the (inner) region 240 of the crane column assembly 120 assembly collects or is collected, for example a low point or a lowest point of the (inner) region 240 of the crane column assembly 120 to which the fluid naturally flows. The fluid may be water, for instance rainwater, lubricating fluid, such as oil, or the like. The drainage channel 312 is described in more detail with regards to sections illustrated in FIGS. 5 and 6 below.

The drainage channel 312 may ensure that fluid that has penetrated the region 240 of the crane column assembly 120 and/or the region between the support arrangement 210 may be drained away quickly and to a great extent. For example, rainwater that has penetrated the crane column assembly 120 during when driving with airstream is drained off. This may reduce rust, or other wear caused by the ingress of fluid inside the crane column assembly 120. Furthermore, components that may be mounted inside the region 240 (e.g. the rotary transfer system, see below) may be less attacked by rust or other wear caused by the ingress of fluid. Furthermore, components (e.g., for improved operation of the crane such as an endless slewing drive, see below) which are very sensitive to fluid, or the like may be accommodated in the region 240 where penetrated liquids get drained away quickly.

Furthermore, the drainage channel 312 may ensure that a body 150 and/or a platform on which the crane column assembly 120 is mounted is not or less damaged by moisture seeping from the region 240 of the crane column assembly 120 to the body 150. That is due to the drainage of fluids from the region 240 by the drainage channel 312 less fluid will be in the region 240 and therefore no or less moisture may seep from the region 240 to the body 150 and/or a platform. In the case of the crane column assembly 120 being mounted on the compartment box 140, less or no moisture may be seeping into the compartment box 140 and therefore no or less rust or other wear and tear may be caused by the ingress of fluid. Furthermore, damage to the electronics or other sensitive components in the compartment box 230 may be prevented or minimized, thereby extending the lift time of the corresponding components. All of this applies regardless of the cover arrangement 230, but in particular these aspects also work synergistically together with the cover arrangement 230, which ensures that less water penetrates into the region 240.

In some examples, the crane column assembly 120 comprises a slewing drive 320. The slewing drive 320 may be arranged below the base structure. The slewing drive 320 may be configured for slewing at least part of the crane column assembly 120. In some examples, the slewing drive 320 may be mounted between the support arrangement 210 and the base plate 310. The slewing drive 320 may enable precise rotational movement of the support arrangement 210 and the crane boom 130 supported by support arrangement 210 around the vertical axis of the support arrangement 210. The slewing drive 320 may comprise a slewing bearing, which is capable of handling axial, radial, and moment loads, ensuring smooth rotation of the support arrangement 210 and the crane boom 130. Further, the slewing drive 320 may comprise a drive mechanism, for instance a worm gear driven by electric, hydraulic, or pneumatic motors, to provide the necessary rotational force with high precision and control. For instance, the slewing drive 320 may be mounted to the base plate 310 using screws 322, or rivets or welding or another type of fastening.

In some examples, the crane column assembly 120 may further comprise a rotary transfer system 330 which may be mounted onto a surface of the base plate 310. That is the region 240 of the crane column assembly 120 and/or the region between the support arrangement 210 comprises space for receiving the rotary transfer system 330. The rotary transfer system is arranged to facilitate the transfer of electricity, power, signals, and/or fluids/gases between stationary parts (e.g., the base plate 310) and the rotating parts (e.g., the support structure 210 and the supported crane boom 130) of the crane column assembly 120. This enables a continuous rotation (also referred to as 360°endless rotation) without tangling or disconnecting and connection. In some examples the rotary transfer system 330 comprises a rotary distributor (for example an oil distributor) and/or a slip ring.

For instance, the slewing drive 320 may be mounted to the base plate 310 using screws 322, or rivets or welding or another type of fastening. Similarly, the base structure 220 of the support arrangement 210 may be mounted to the slewing drive 320 using, for example, screws 222, rivets, welding, or another type of fastening, or may likewise be mounted directly to the base plate 310.

The usage of the rotary transfer system 330 may be specifically suited for the above-described design of the crane column assembly 120 because the crane column assembly 120 may only provide a confined space. For instance, the support arrangement 210 may comprise at least one of the following dimensions: Width at least 15 cm and/or maximum 35 cm, length at least 20 cm and/or maximum 45 cm and/or height at least 30 cm and/or maximum 60 cm.

Further, the support arrangement 210 may comprise one or more lateral through-holes (e.g., a hole in the horizontal plane along the vertical dimension of the support structure 210). For instance, one or more portions of the support arrangement 210 may comprise one or more lateral through-holes. In some examples, if the support arrangement 210 comprises two portions, the first portion 212 and the second portion 214, the first portion may comprise a first lateral through-hole 252 and the second portion may comprise a second lateral through-hole (not shown in the figures).

In some examples, the crane column assembly 120 may comprise one or more cover portions mounted adjacent to the one or more portions of the support arrangement 210 arranged to cover the one or more lateral through-holes. For instance, the crane column assembly 120 comprises a first cover portion 342 arranged adjacent to a first portion 212 of the support arrangement 210. This first cover portion 342 may cover a first through-hole 252 which is located in the first support portion 212. In some examples, the first cover portion 342 may be arranged at a side of the first portion 212 of the support arrangement 210 opposite to the cover structure 230. Accordingly, the crane column assembly 120 may comprise a second cover portion 344 arranged adjacent to the second portion 214 of the support arrangement 210. This second cover portion 344 may cover a second through-hole (now shown in the figures) which may be located in the second portion 214 of the support arrangement 210. The second cover portion 344 may be arranged at a side of the second portion 214 of the support arrangement 210 which is opposite to the cover structure 210. For example, the first cover portion 342 and the second cover portion 344 may mounted at an outer surface of the support arrangement 210 and the cover arrangement 230 may be mounted at an inner side of the support arrangement 230.

For instance, the one or more cover portions may be screwed, riveted, glued, welded, or connected with another type of fastening to the support arrangement 210. In another example, the one or more cover portions may be connected to the support arrangement 210 in such a way that they can be easily removed and reconnected, for example with a re-closable fastener. In any case, however, the cover portions are sealingly connected to the support arrangement 210. Thus, the one or more cover portions may be arranged to seal the region 240 of the crane column assembly and/or the region between the support arrangement 210. Therefore, no or less fluid or other substances may enter or region the region 240 of the crane column assembly 120 and/or the region between the support arrangement 210 from the side on which the one or more cover portions are attached to the support arrangement 210. Therefore, the one or more cover portions may prevent or minimize rust, or other wear caused by the ingress of fluid to the inside the crane column assembly 120 or any component mounted inside the region 240 or below the crab column assembly 120.

In one embodiment, the one or more cover portions may have one or more slits or recesses. The recesses can be arranged in such a way that very little water can penetrate. The recesses can be used for ventilation.

Figure 5:
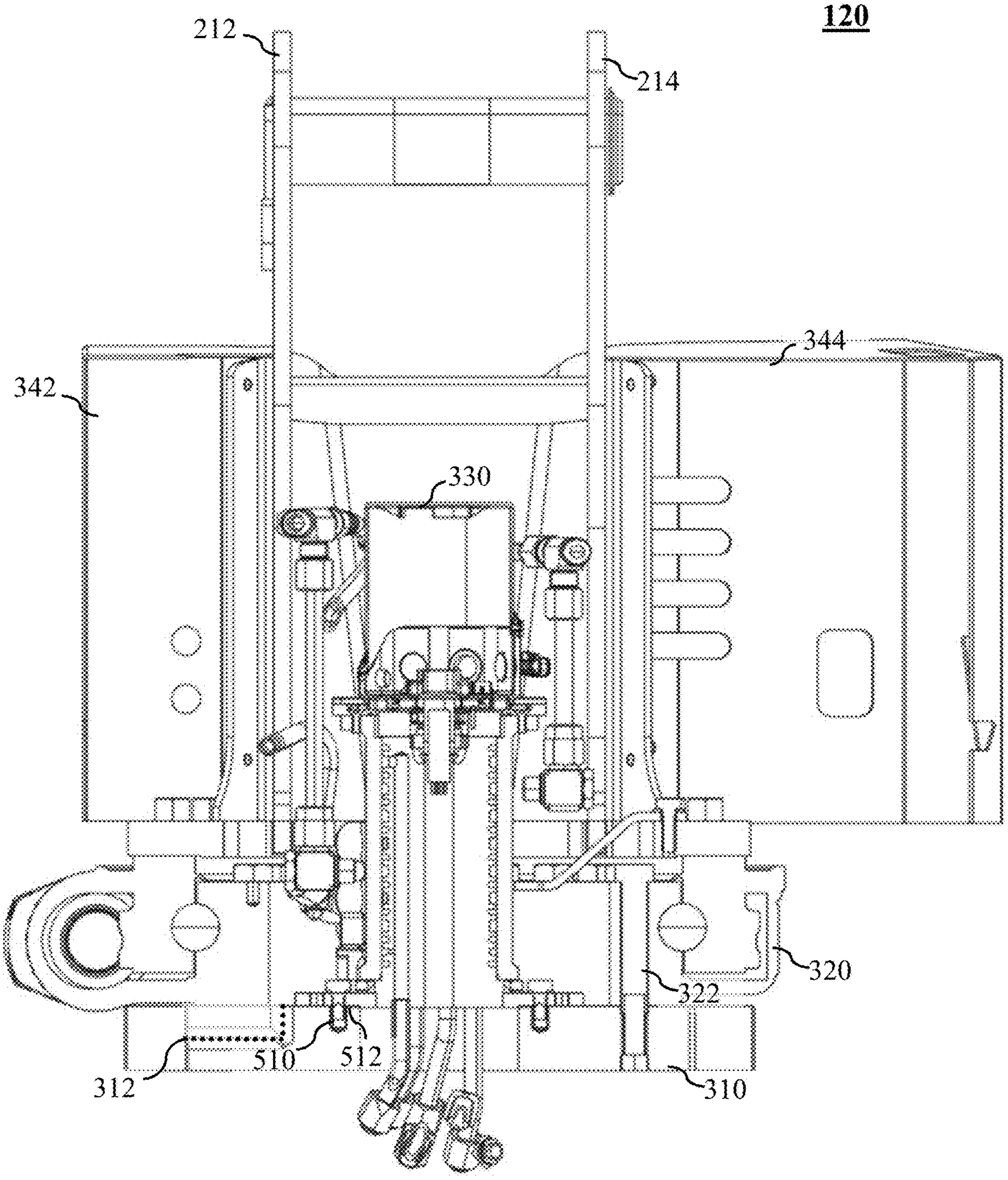
FIG. 5 illustrates a section of the crane column assembly of FIG. 4 taken along the line V-V.
Figure 6:
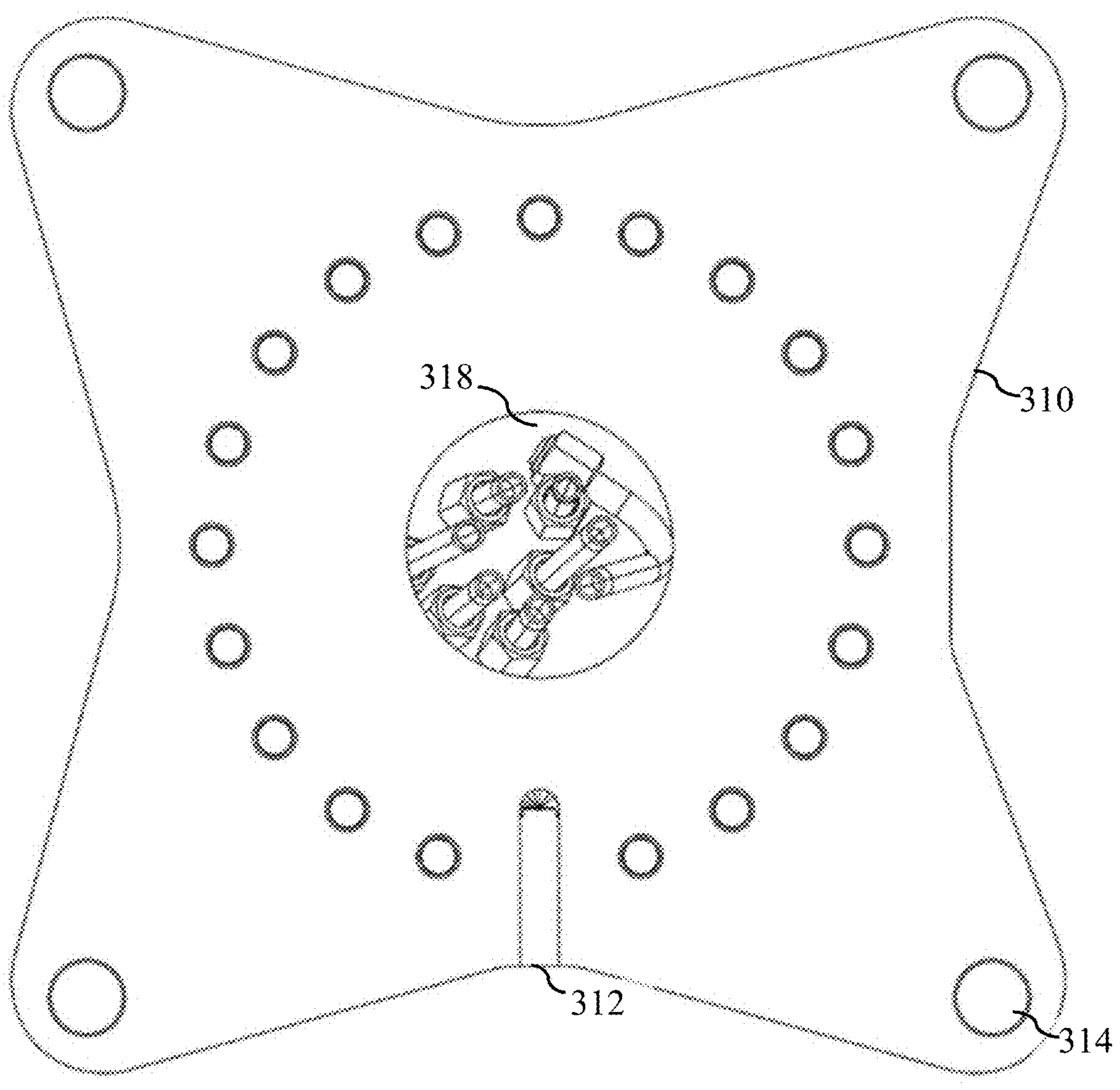
FIG. 6 illustrates a section of the crane column assembly of FIG. 4 taken along the line VI-VI.

Coming to the sections of the crane column assembly of FIG. 4 illustrated in FIGS. 5 and 6 which illustrate the drainage channel 312 in more detail. FIG. 5 illustrates a section taken along the line V-V of FIG. 4. FIG. 6 illustrates a section taken along the line VI-VI of FIG. 4.

In some examples, the at least one drainage channel 312 may extend away from an upper side of the base plate 310. The upper side of the base plate 310 may be a surface facing the support arrangement 210, that is the upper side extends in a horizontal plane of the base plate 310. That is the drainage channel 312, or a portion of the drainage channel 312, may start at the side facing the support arrangement 210 and is extending vertically into the base plate 310.

In some examples the at least one drainage channel 312 may extend laterally outwards at an upper surface (e.g., a side facing the support arrangement 210) of the base plate 310 and/or inside the base plate 310. The starting point of the drainage channel 312 may for example be at the upper surface of the base plate 310. The lateral extension (also referred to as radial extension) of the drainage channel 312 may comprise the drainage channel 312 extending from its starting point outwards to a side surface of the base plate 310. A side surface may be a surface of the base plate 310 that is orthogonal to the upper surface of the base plate 310. In some examples, the drainage channel 312 may comprise a component which extends within the horizontal plane of the base plate. The drainage channel may extend partially or completely within the horizontal plane. In some examples, the drainage channel 312 may however comprise a component extending in the vertical direction. For example, an angle formed between the drainage channel 312 and the vertical dimension may be 0°, 5°, 10°, 15°, 20° or more. This may make it easier for water to drain outwards, for example. For instance, the drainage channel 312 may extend outwards at a surface of the base plate 310, for example as a semi-open channel. In another example, the drainage channel 312 may extend partially or fully inside base plate 310.

In some examples, the draining channel 312 may comprise one or more portions that may be directed in different directions. For instance, the draining channel 312 may change its direction one or more times. For example, the drainage channel 312 may have a cross-section of an “L” or of a cascade, i.e., comprising one or more portions running in a vertical direction and comprising one or more portions running in the horizontal plane.

For example, the starting point of the drainage channel 312 may be located along a lateral/radial line (between the center of the base plate 310 and a side surface of the base plate 310) beyond (in direction of the side surface of the base plate) a fastening element 510. The fastening element 510 may be connecting the rotary transfer system 330 and the base plate 310.

In some examples, the base plate 310 comprises a plurality of drainage channels arranged to drain fluid from the region 240 covered by the cover arrangement 230. The one or more drainage channels may start at the same starting point and extending outwards in different directions, or they may be fully distinct with different starting points. They may be arranged symmetrically or asymmetrically on the surface and/or inside the base plate 230.

Further, the crane column assembly 120 may comprise a sealing 512 between the rotary transfer system 330 and the base plate 310. For instance, the sealing 512 may be positioned between the fastening element 510, which is connecting the rotary transfer system 330 and the base plate 310, and the base plate 310. For instance, the sealing 512 may comprise a sealing material such as rubber, Polytetrafluorethylene (PTFE), silicone, anaerobic adhesives, metallic components (such as copper, aluminum or lead) or the like which is inserted between the fastening element 512/the rotary transfer system 330 and the base plate 310. Further, the sealing 512 may comprise a (flat) gasket selected according to the required size and thickness may to optimally cover the sealing surfaces. Further, the sealing 512 may comprise an O-ring for instance made from elastomeric materials or the like.

Figure 7:
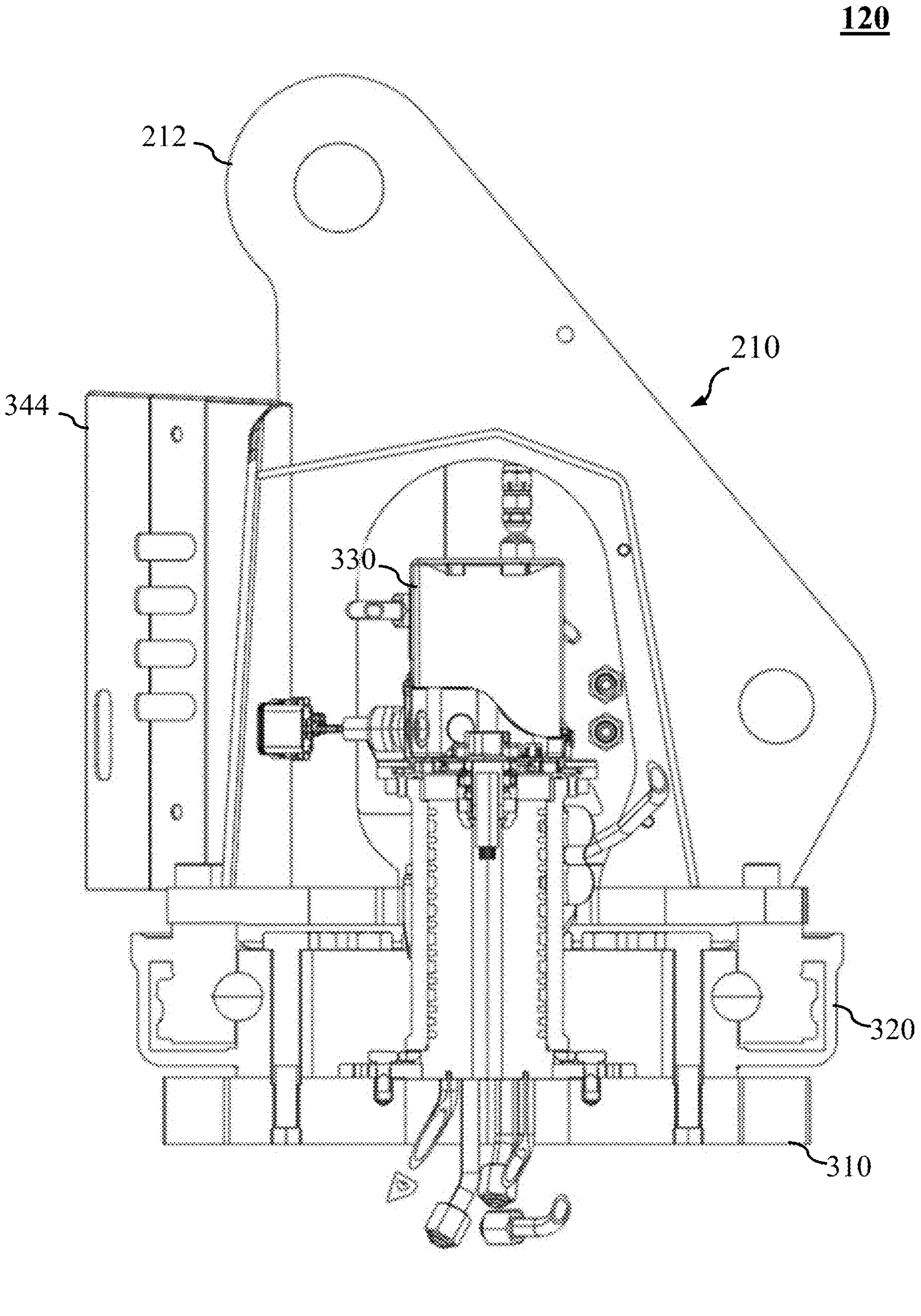
FIG. 7 illustrates a section of the crane column assembly of FIG. 4 taken along the line VII-VII.
Figure 8:
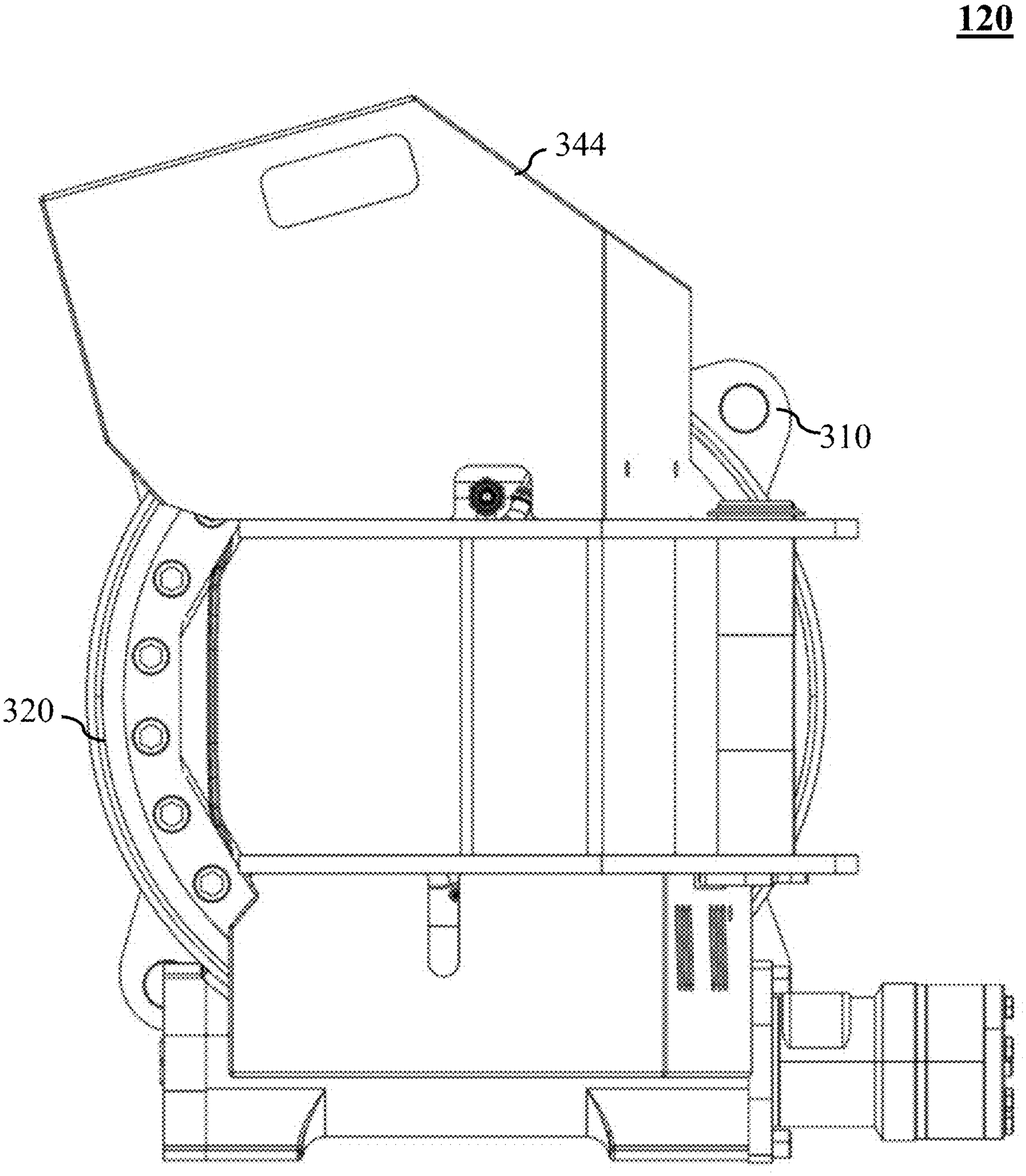
FIG. 8 illustrates a section of the crane column assembly of FIG. 4 taken along the line VIII-VIII.
Figure 9:
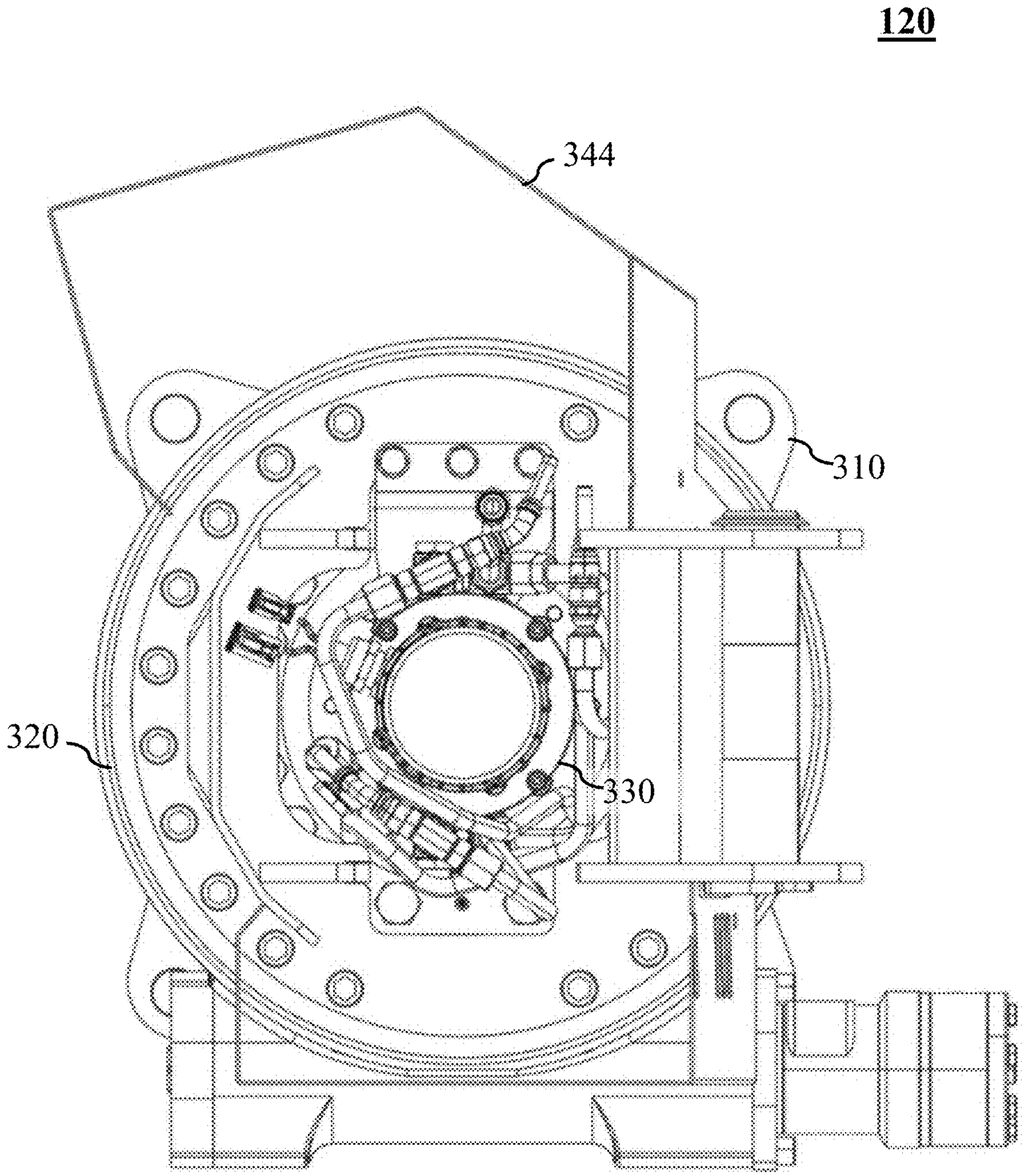
FIG. 9 illustrates a section of the crane column assembly of FIG. 4 taken along the line IX-IX.
Figure 10:
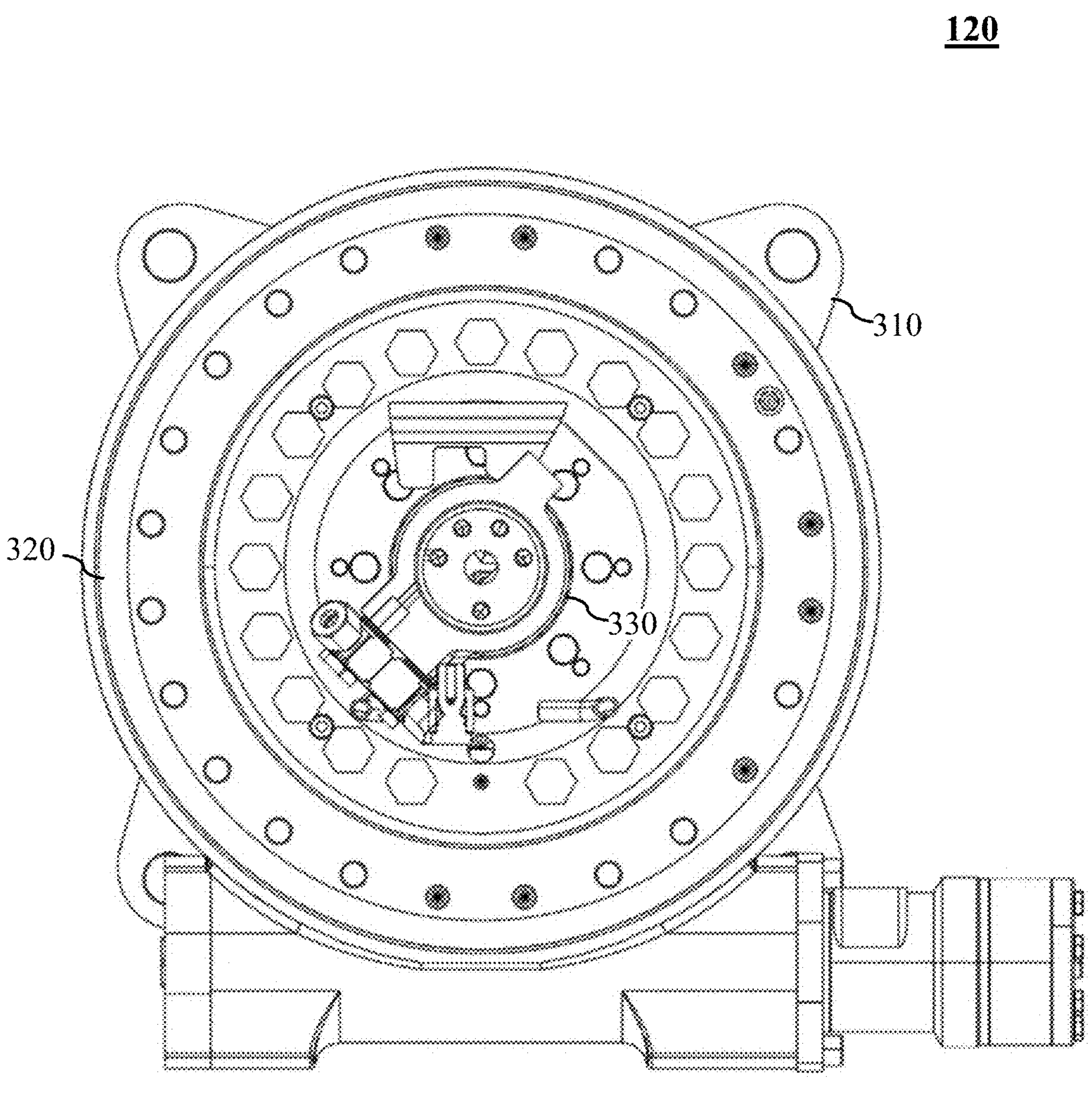
FIG. 10 illustrates a section of the crane column assembly of FIG. 4 taken along the line X-X.

FIGS. 7 to 10 illustrate further sections of the crane column assembly 120 illustrated in FIG. 4, that is: FIG. 7 illustrates a section taken along the line VII-VII of FIG. 4. FIG. 8 illustrates a section taken along the line VIII-VIII of FIG. 4. FIG. 9 illustrates a section taken along the line IX-IX of FIG. 4. FIG. 10 illustrates a section taken along the line X-X of FIG. 4.

As described with regards to FIG. 1 the crane column assembly 120 as described in this disclosure may be used together with a crane boom in a crane. For instance, the column assembly 120 as described in this disclosure may be used in a transportable crane (such as mobile crane, a service crane, a loader crane, a lorry or truck-mounted crane, a stiff boom crane and a knuckle boom crane the like), tower crane, telescopic crane, jib crane, gantry crane, marine crane, deck crane or the like.

In some examples crane 110 (e.g., the crane column assembly 120) may be mounted onto the body 150 and/or a compartment box 140. The crane 110 together with the compartment box 140 and/or the body 150 may form a crane assembly 100 which may be mounted on a platform. A platform may be a vehicle, like a car or a truck or a train or the like. Further, the platform may be ship or the like.

The crane column assembly 120 as described with this disclosure may be used in a turnkey solution crane. That is the crane column assembly 120 may be integrated in a crane, for example together with a compartment box 140 and/or the body 150 which may be assembled and provided as a ready-to-operate crane assembly (crane system). Such a crane assembly may be a fully functional crane setup which may be mounted on a plurality of different platform as described above.

Figure 11:
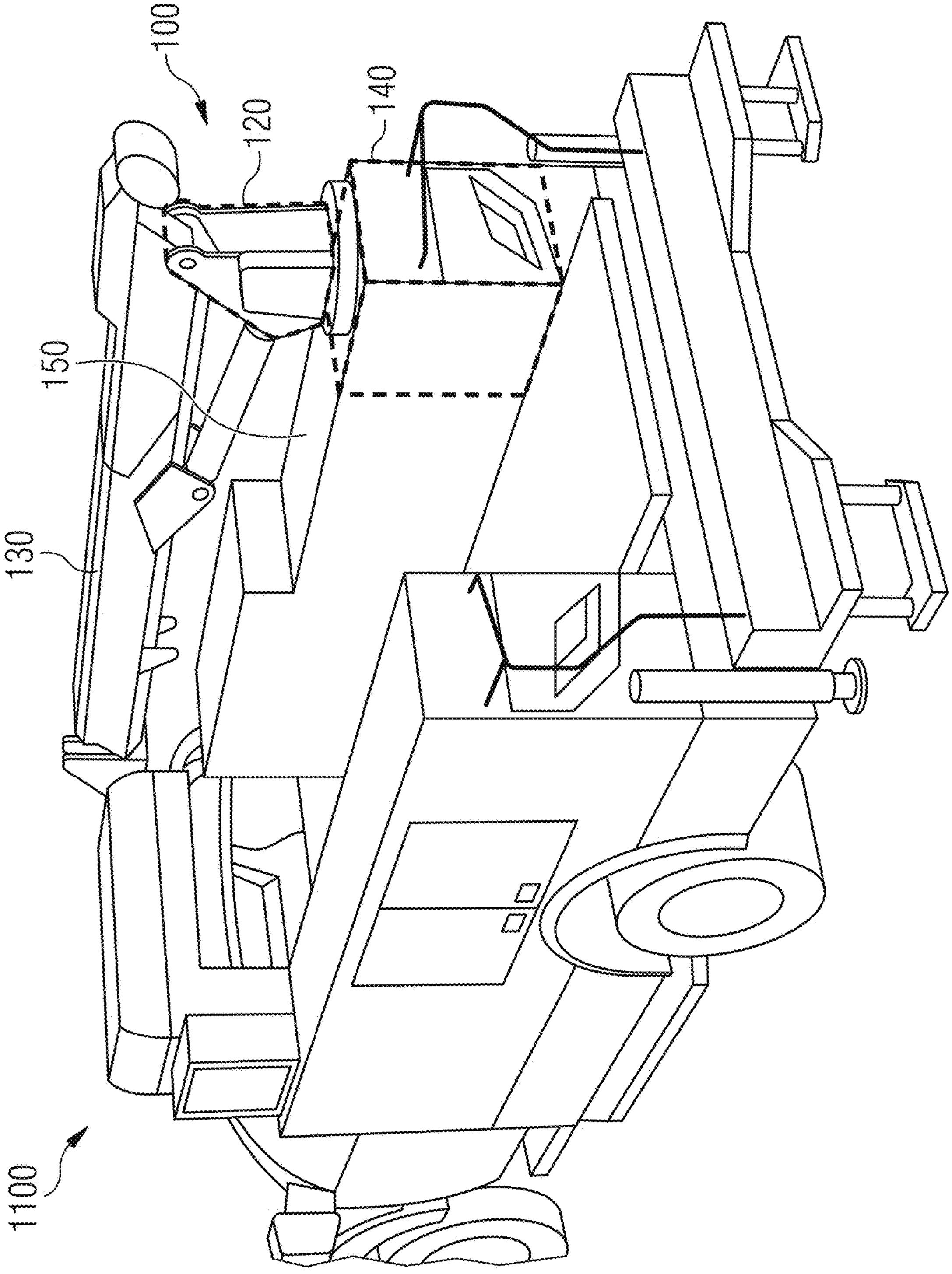
FIG. 11 illustrates an example of a vehicle on which the crane column assembly is mounted.

FIG. 11 illustrates an example of a vehicle on which the crane column assembly 120 is mounted. The vehicle 1100 comprise a crane assembly 100. The crane assembly 100 may comprise a body 150. The body 150 may be configured to mount the crane assembly onto the vehicle. The crane assembly 100 comprises a compartment box 140. The compartment box 140 may comprise a controller configured to control the crane and/or a winch controlling a crane hook. The compartment box 140 may be part of the body 150. In another embodiment the compartment box 140 or the crane column assembly 120 may be mounted onto a platform directly (without a body and/or compartment box, see FIG. 11). Further, the crane assembly 100 comprises the crane column assembly 120 as described in this disclosure. The crane column assembly 120 is mounted onto the compartment box 140 and/or the body. The crane column assembly 120 supports a crane boom 130.

In the following, some examples of the proposed concept are presented:

An example (e.g., example 1) relates to a crane column assembly for a crane to be mounted on a mobile platform, the crane column assembly comprising a support arrangement arranged to support a crane boom, wherein the support arrangement is connected to a base structure, and a cover arrangement arranged between the support arrangement, wherein the cover arrangement covers a region of the crane column assembly comprising a region between the support arrangement.

Another example (e.g., example 2) relates to a previous example (e.g., example 1) or to any other example, further comprising a base plate mounted below the base structure, wherein the base plate comprises at least one drainage channel arranged to drain fluid from the region covered by the cover arrangement.

Another example (e.g., example 3) relates to a previous example (e.g., example 2) or to any other example, further comprising a slewing drive, mounted between the support arrangement and the base plate.

Another example (e.g., example 4) relates to a previous example (e.g., one of the examples 1 to 3) or to any other example, further comprising that the cover arrangement comprises a canopy portion arranged over the region of the crane column assembly and between the support arrangement, the region of the crane column assembly comprising an inner region of the crane column assembly.

Another example (e.g., example 5) relates to a previous example (e.g., one of the examples 1 to 4) or to any other example, further comprising that the cover arrangement comprises at least one of a first lateral portion, a canopy portion and a second lateral portion, wherein the first lateral portion and the second lateral portion are arranged at least partially between the support arrangement.

Another example (e.g., example 6) relates to a previous example (e.g., one of the examples 1 to 5) or to any other example, further comprising that the region between the support arrangement comprises space for receiving a rotary transfer system, wherein the cover arrangement covers at least part of the rotary transfer system.

Another example (e.g., example 7) relates to a previous example (e.g., one of the examples 2 to 6) or to any other example, further comprising that a rotary transfer system of the crane column assembly is mounted onto a surface of the base plate.

Another example (e.g., example 8) relates to a previous example (e.g., one of the examples 1 to 6) or to any other example, further comprising a sealing mounted between the rotary transfer system and the base plate.

Another example (e.g., example 9) relates to a previous example (e.g., one of the examples 6 to 8) or to any other example, further comprising that the rotary transfer system comprises a rotary distributor and/or a slip ring.

Another example (e.g., example 10) relates to a previous example (e.g., one of the examples 2 to 9) or to any other example, further comprising that the at least one drainage channel extends away from an upper side of the base plate, the upper side of the base plate facing the support arrangement.

Another example (e.g., example 11) relates to a previous example (e.g., one of the examples 2 to 10) or to any other example, further comprising that the at least one drainage channel extends laterally outwards at an upper side of the base plate and/or inside the base plate.

Another example (e.g., example 12) relates to a previous example (e.g., one of the examples 2 to 11) or to any other example, further comprising that the base plate comprises a plurality of drainage channels arranged to drain fluid from the region covered by the cover arrangement.

Another example (e.g., example 13) relates to a previous example (e.g., one of the examples 1 to 12) or to any other example, further comprising that the support arrangement comprises a first portion and a second portion.

Another example (e.g., example 14) relates to a previous example (e.g., example 13) or to any other example, further comprising that the first portion and the second portion of the support arrangement form a hinge with the crane boom.

Another example (e.g., example 15) relates to a previous example (e.g., example 14) or to any other example, further comprising that an attachment of the hinge extends between the first portion and the second portion support arrangement.

Another example (e.g., example 16) relates to a previous example (e.g., one of the examples 1 to 15) or to any other example, further comprising that a first portion and/or a second portion of the support arrangement comprises a lateral through-hole.

Another example (e.g., example 17) relates to a previous example (e.g., one of the examples 1 to 16) or to any other example, further comprising a first cover portion arranged adjacent to a first portion of the support arrangement, wherein the first cover portion covers a through-hole located in the first support portion.

Another example (e.g., example 18) relates to a previous example (e.g., example 17) or to any other example, further comprising that the first cover portion is arranged at a side of the first portion of the support arrangement opposite to the cover structure.

Another example (e.g., example 19) relates to a previous example (e.g., one of the examples 17 or 18) or to any other example, further comprising a second cover portion arranged adjacent to a second portion of the support arrangement, wherein the second cover portion covers a through-hole located in the second portion of the support arrangement.

Another example (e.g., example 20) relates to a previous example (e.g., example 19) or to any other example, further comprising that the second cover portion is arranged at a side of the second portion of the support arrangement opposite to the cover structure.

Another example (e.g., example 21) relates to a previous example (e.g., one of the examples 19 or 20) or to any other example, further comprising that the first cover portion and the second cover portion are arranged to seal the region between the support arrangement.

Another example (e.g., example 22) relates to a previous example (e.g., one of the examples 1 to 21) or to any other example, further comprising that the cover arrangement is welded to the support arrangement.

Another example (e.g., example 23) relates to a previous example (e.g., one of the examples 1 to 22) or to any other example, further comprising that the crane column assembly is mountable onto a compartment box, wherein the compartment box is arranged to be mounted on the mobile platform.

An example (e.g., example 24) relates to a crane, comprising the crane column assembly according to any one of examples 1 to 23, the crane boom supported by the crane column assembly.

An example (e.g., example 25) relates to a crane assembly, comprising the crane according to example 24, a compartment box comprising circuitry configured to control the crane, wherein the crane is mounted onto the compartment box and wherein compartment box is mounted onto the vehicle.

An example (e.g., example 26) relates to a vehicle, comprising the crane assembly according to example 25, wherein compartment box is mounted onto the vehicle.

The aspects and features described in relation to a particular one of the previous examples may also be combined with one or more of the further examples to replace an identical or similar feature of that further example or to additionally introduce the features into the further example.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A crane column assembly for a crane to be mounted on a mobile platform, the crane column assembly comprising:

a support arrangement arranged to support a crane boom, wherein the support arrangement comprises a first vertically-extending portion and a second vertically-extending portion, the first and second vertically-extending portions being mounted on a base structure;

a cover arrangement arranged between the support arrangement, wherein the cover arrangement covers a region of the crane column assembly comprising a region between the first vertically-extending portion and the second vertically-extending portion of the support arrangement; and a base plate mounted below the base structure, wherein the base plate comprises at least one drainage channel having an inlet located on an upper surface of the base plate in a region aligned laterally between the first vertically-extending portion and the second vertically-extending portion of the support arrangement, the at least one drainage channel arranged to drain fluid from the region covered by the cover arrangement.

2. The crane column assembly according to claim 1, further comprising a slewing drive, arranged below the base structure, wherein the slewing drive is configured for slewing at least part of the crane column assembly.

3. The crane column assembly according to claim 1, wherein the cover arrangement comprises a canopy portion arranged over the region of the crane column assembly and between the support arrangement, the region of the crane column assembly comprising an inner region of the crane column assembly.

4. The crane column assembly according to claim 1, wherein the cover arrangement comprises at least one of a first lateral portion, a canopy portion and a second lateral portion, wherein the first lateral portion and the second lateral portion are arranged at least partially between the support arrangement.

5. The crane column assembly according to claim 1, wherein the region between the support arrangement comprises space for receiving a rotary transfer system, wherein the cover arrangement covers at least part of the rotary transfer system.

6. The crane column assembly according to claim 1, wherein a rotary transfer system of the crane column assembly is mounted onto a surface of the base plate.

7. The crane column assembly according to claim 6, further comprising a sealing mounted between the rotary transfer system and the base plate.

8. The crane column assembly according to claim 1, wherein the at least one drainage channel extends away from an upper side of the base plate, the upper side of the base plate facing the support arrangement.

9. The crane column assembly according to claim 1, wherein the at least one drainage channel extends laterally outwards at an upper side of the base plate and/or inside the base plate.

10. The crane column assembly according to claim 1, wherein the first vertically-extending portion and the second vertically-extending portion of the support arrangement form a hinge with the crane boom.

11. The crane column assembly according to claim 10, wherein an attachment of the hinge extends between the first vertically-extending portion and the second vertically-extending portion of the support arrangement.

12. The crane column assembly according to claim 1, wherein the first vertically-extending portion and/or the second vertically-extending portion of the support arrangement comprises a lateral through-hole.

13. The crane column assembly according to claim 1, further comprising a first cover portion arranged adjacent to the first vertically-extending portion of the support arrangement, wherein the first cover portion covers a through-hole located in the first vertically-extending portion of the support arrangement.

14. The crane column assembly according to claim 13, further comprising a second cover portion arranged adjacent to the second vertically-extending portion of the support arrangement, wherein the second cover portion covers a through-hole located in the second vertically-extending portion of the support arrangement.

15. The crane column assembly according to claim 1, wherein the crane column assembly is mountable onto a compartment box, wherein the compartment box is arranged to be mounted on the mobile platform.

16. A crane, comprising:

the crane column assembly according to claim 1;

the crane boom supported by the crane column assembly.

17. A crane assembly, comprising:

the crane according to claim 16;

a compartment box comprising circuitry configured to control the crane, wherein the crane is mounted onto the compartment box and wherein the compartment box is mounted onto a vehicle.

18. A vehicle, comprising:

the crane assembly according to claim 17, wherein the compartment box is mounted onto the vehicle.

* * * * *